UNITED STATES PATENT OFFICE.

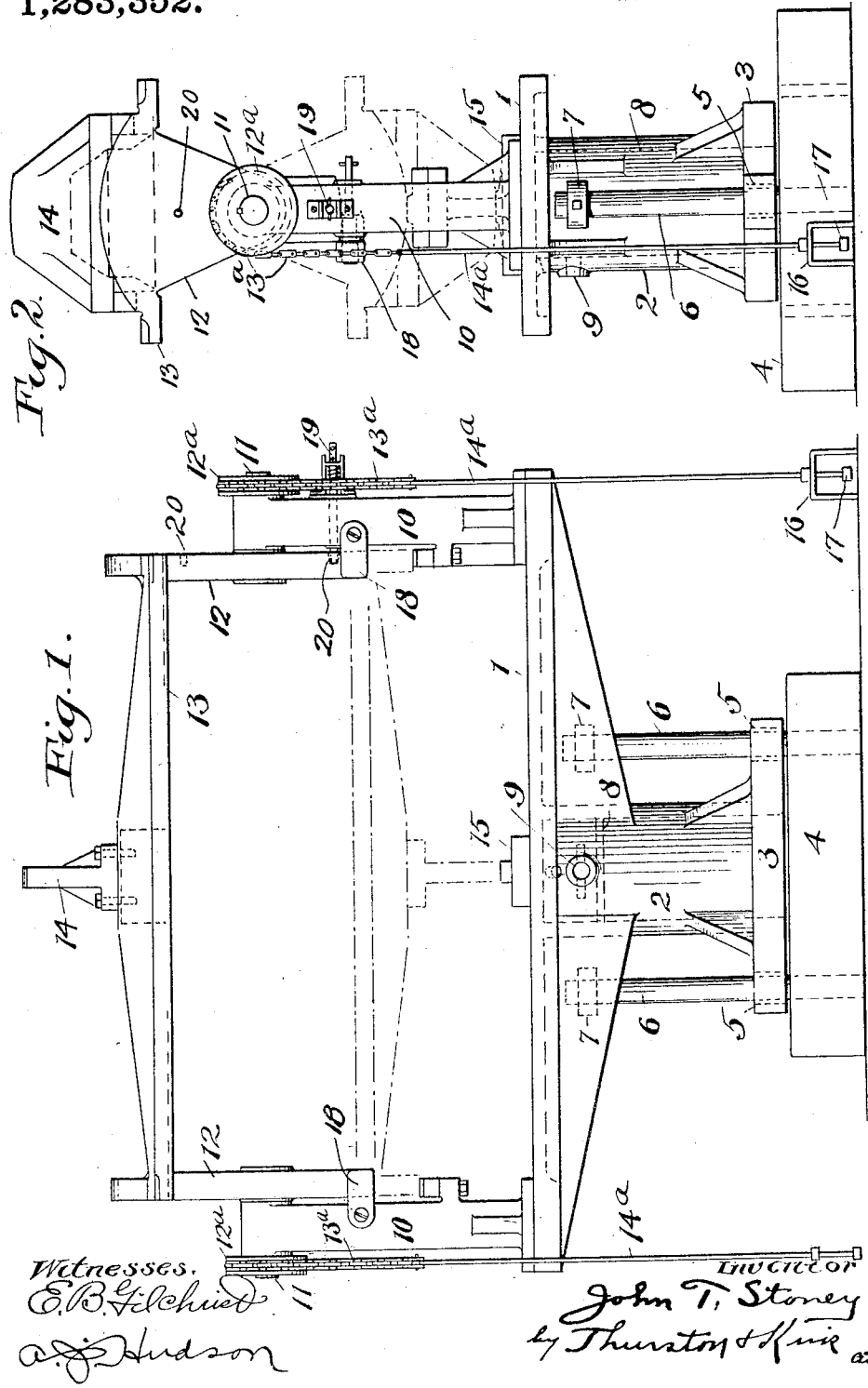
J. T. STONEY.
ROLL OVER MECHANISM FOR MOLDING MACHINES
APPLICATION FILED DEC. 10, 1913.
1,283,352.
Patented Oct. 29, 1918.

JOHN T. STONEY, OF CLEVELAND, OHIO, ASSIGNOR TO THE OSBORN MANUFACTURING COMPANY, OF CLEVELAND, OHIO, A CORPORATION OF OHIO.

ROLL-OVER MECHANISM FOR MOLDING-MACHINES.

1,283,352.   Specification of Letters Patent.   Patented Oct. 29, 1918.

Application filed December 10, 1913. Serial No. 805,687.

*To all whom it may concern:*

Be it known that I, JOHN T. STONEY, a citizen of the United States, residing at Cleveland, in the county of Cuyahoga and State of Ohio, have invented a certain new and useful Improvement in Roll-Over Mechanism for Molding-Machines, of which the following is a full, clear, and exact description.

This invention relates to molding machines and has for its object the equipping of a molding machine having a table which rolls over, with a device whereby the table may be rolled over by power instead of by hand, as is the usual custom.

Generally speaking, the invention comprises the elements and combinations thereof set forth in the accompanying claims.

Reference should be had to the accompanying drawings forming a part of this specification, in which Figure 1 is a front elevation, and Fig. 2 is a side elevation of a molding machine embodying my invention.

The machine illustrated comprises a jarring table, or platform 1, which is mounted upon a cylinder 2, and if desirable may be formed integral with the jarring table. At its lower portion, the cylinder 2 is provided with a flanged portion 3, which is adapted to contact with a base or anvil 4. Through the flange there are openings 5, through which extend upright rods 6, which at their lower ends are anchored into the base 4. At their upper ends the rods are provided with nuts 7 which may be adjusted on the rods 6. This construction just described is for the purpose of limiting the upward movement of the table.

Extending upwardly from the base 4, within the cylinder 2 is a piston 8, the piston forming a guiding means upon which the cylinder 2 may reciprocate. In the cylinder 2, at that portion which lies above the piston 8 is an opening 9 which may be connected with a supply of compressed air, which will be regulated by a suitable valve mechanism, (not shown) so that the cylinder 2 and table 1 may be jarred or air may be continuously forced between the cylinder and piston so as to raise the table 1, as far as permitted by the guide rods 6.

Mounted upon the table 1 are spaced uprights 10, which at their upper ends are provided with journals in which are seated short shafts 11. These shafts at their inner ends are secured to the side arms 12, of a molding table, or flask support 13. It will thus be seen that the shafts 11 in effect form trunnions for the swinging molding table 13.

In the particular instance shown, there is upon the bottom of the molding table, or support 13, a foot 14, which is adapted to engage with a stop or rest 15 carried by the jarring table 1.

Upon the outer end of each shaft 11, there is secured a wheel 12ª, and secured to the wheel is a sprocket chain 13ª. This chain extends along the periphery of the wheel for a certain distance, and preferably the wheel 12ª is grooved to receive the chain 13ª.

The end of the chain is fastened to a rod 14ª which may conveniently extend down into the pit in which the molding machine is usually mounted, and is adapted to extend through an opening in the bracket 16. Upon the lower end of the rod 14ª is an adjustable nut 17 to limit the amount of play which the rod 14ª may have with respect to the bracket 16.

The operation of the device is as follows:

When the table 1 is raised by the admission of air between the piston 8 and the cylinder 2, the rod 14ª is lifted in the first instance, until the nut at the bottom thereof engages with the bracket 16. At this time, the rod 14ª and chain 13ª are held against further movement, and so produce a rotation of the wheel 12ª, thus causing the shafts 11 to turn, and thereby the molding table 13.

There is provided a stop 18, which limits the movement of the arms 12, so that the same will be held in upright position.

There is also a spring pressed plunger 19 which is adapted to coöperate with suitable openings 20 formed in the one arm 12 so that the table 13 may be locked either in its inverted position or in its normal position when the foot 14 and the rest 15 are in engagement.

The reason for allowing some play between the end of the rod 14 and the bracket 16 is that the table 1 may be jarred without putting any strain upon the rod 14.

Having thus described my invention, what I claim is:

1. In a machine of the character described, the combination of a flask-support; means for raising said support; and means for turning said support relatively to said raising means, said last-named means including a member made up of a plurality of linked parts anchored at one end and connected with said support eccentrically of its axis.

2. In a machine of the character described, the combination of a flask-support; means for raising said support; and means for turning said support relatively to said raising means, said last-named means including a rotatable member connected with said support and a flexible member anchored at one end and connected with said rotatable member at the other.

3. In a molding machine, the combination of a roll-over molding table; means for raising and lowering said table; and a flexible member secured at one end with respect to said table, the opposite end of said flexible member being secured to said table to cause the same to roll over as it is elevated.

4. In a molding machine, the combination of a roll-over table; means for raising and lowering said table; an annular member connected with said roll-over table; and a flexible member coöperating with said annular member, one end of said flexible member being held against any substantial movement, whereby the table is rolled over, as it is raised.

5. In a molding machine, the combination of a molding table; uprights in which the said table is trunnioned; supporting means for the uprights; means for raising and lowering said supporting means; and a flexible member adapted to extend around a trunnion of said molding table, one end of said flexible member being secured against substantial movement, whereby said table is rolled over, as the support is raised.

6. In a molding machine, the combination of a molding table; supports in which said table is trunnioned; means for raising and lowering the said supports; an annular member mounted on each of the trunnions for the table; and a flexible member connected to each of said annular members and extending around the same, the opposite ends of said flexible members being secured so as to be relatively immovable with respect to said molding table.

7. In a molding machine, the combination of a roll-over table; means for raising and lowering said table; an annular member connected with the roll-over table; and a flexible member, one end of which is secured to and coöperates with the said annular member, the other end of said flexible member having a slight amount of movement as the table is raised, but eventually becoming fixed, whereby the table is rolled over as it is raised.

8. In a molding machine, the combination with a jarring table; of a roll-over table; means for raising and lowering said roll-over table; an annular member connected with the roll-over table; and a flexible member, one end of which is secured to and coöperates with said annular member, the other end of said flexible member having a slight amount of movement to permit the jarring action, but becoming fixed as the roll-over table is raised, thereby to cause the said table to roll over as it is raised.

9. In a molding machine, the combination with a jarring table; of a roll-over molding table; means for raising and lowering said roll-over molding table; an annular member connected with the molding table; a flexible member, one end of which is secured to and coöperates with the annular member, the other end of said flexible member being provided with a head; and a stop member with which the said head coöperates when the said roll-over molding table is raised, whereby the roll-over molding table is rolled over as it is raised, said stop and head having a limited amount of play whereby the roll-over molding table may jar with the jarring table without affecting the said flexible member.

10. In a machine of the character described, the combination of a platform movable through different distances to jar a flask or to raise the same, as desired; a roll-over flask-support mounted upon said platform; and means for turning said support relatively to said platform, upon flask-raising movement of the latter.

11. In a machine of the character described, the combination of a platform movable through different distances to jar a flask or to raise the same, as desired; a roll-over flask-support mounted upon said platform; and means for turning said support relatively to said platform, upon flask-raising movement of the latter, said turning means remaining inoperative during jarring movement of said platform.

12. In a machine of the character described, the combination of a platform movable through different distances to jar a flask or to raise the same, as desired; spaced uprights mounted on said platform; a roll-over flask-support trunnioned in said uprights; and means for turning said support relatively to said platform, upon flask-raising movement of the latter, said turning means remaining inoperative during jarring movement of said platform.

13. In a machine of the character described, the combination of a platform movable through different distances to jar a flask or to raise the same, as desired; spaced uprights mounted on said platform; a roll-over flask-support trunnioned in said uprights, and means for turning said support relatively to said platform, said means including a member made up of a plurality of linked parts anchored at one end and connected with said support eccentrically of its axis.

14. In a machine of the character described, the combination of a platform movable through different distances to jar a flask or to raise the same, as desired; spaced uprights mounted on said platform; a roll-over flask-support trunnioned in said uprights; means for turning said support relatively to said platform, said means including a rotatable member connected with said support; and a flexible member anchored at one end and connected with said rotatable member at the other.

15. In a machine of the character described, the combination of a platform movable through different distances to jar a flask or to raise the same, as desired; spaced uprights mounted on said platform; a roll-over flask-support trunnioned in said uprights; means for turning said support relatively to said platform, said means including a rotatable member connected with said support; and a flexible member anchored at one end and connected with said rotatable member at the other, said flexible member having a slight amount of movement to permit the jarring action but becoming fixed as said support is raised so as to cause the latter to roll over.

16. In a machine of the character described, the combination of a fixed piston; a cylinder vertically reciprocable thereon and provided with a platform, said cylinder being reciprocable to jar a flask on said platform or to raise the latter, as desired; spaced uprights mounted upon said platform; a roll-over flask-support trunnioned in said uprights; means for turning said support relatively to said platform, said means including a rotatable member connected with said support; and a flexible member anchored at one end and connected with said rotatable member at the other, said flexible member having a slight amount of movement to permit the jarring action but becoming fixed as said support is raised so as to cause the latter to roll over.

17. In a machine of the character described, the combination of a platform movable to jar a flask; a roll-over flask-support mounted upon said platform; means for turning said support relatively to said platform; and means adapted to lock said support in either normal or inverted position.

18. In a machine of the character described, the combination of a platform movable through different distances to jar a flask or to raise the same, as desired; a roll-over flask-support mounted upon said platform; means for turning said support relatively to said platform, upon flask-raising movement of the latter; and means adapted to lock said support in either normal or inverted position.

19. In a machine of the character described, the combination of a platform movable through different distances to jar a flask or to raise the same, as desired; a roll-over flask-support mounted upon said platform; means for turning said support relatively to said platform, upon flask-raising movement of the latter, said turning means remaining inoperative during jarring movement of said platform; means adapted to limit the flask-raising movement of said platform; and means adapted to lock said support in either normal or inverted position.

20. In a machine of the character described, the combination of a platform movable through different distances to jar a flask or to raise the same, as desired; spaced uprights mounted on said platform; a roll-over flask-support trunnioned in said uprights; means for turning said support relatively to said platform, upon flask-raising movement of the latter, said turning means remaining inoperative during jarring movement of said platform; means adapted to limit the flask-raising movement of said platform; and a plunger adapted to lock said support, in either normal or inverted position, to one of said uprights.

In testimony whereof, I hereunto affix my signature in the presence of two witnesses.

JOHN T. STONEY.

Witnesses:
A. J. HUDSON,
L. I. PORTER.